United States Patent
Xie

(10) Patent No.: US 12,133,097 B2
(45) Date of Patent: Oct. 29, 2024

(54) NETWORK OPTIMIZATION METHOD, DEVICE, AND STORAGE MEDIUM

(71) Applicant: ZTE Corporation, Shenzhen (CN)

(72) Inventor: Qinzheng Xie, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 399 days.

(21) Appl. No.: 17/622,513

(22) PCT Filed: Jun. 22, 2020

(86) PCT No.: PCT/CN2020/097554
§ 371 (c)(1),
(2) Date: Dec. 23, 2021

(87) PCT Pub. No.: WO2021/000757
PCT Pub. Date: Jan. 7, 2021

(65) Prior Publication Data
US 2022/0264330 A1 Aug. 18, 2022

(30) Foreign Application Priority Data
Jul. 2, 2019 (CN) .......................... 201910591464.7

(51) Int. Cl.
*H04W 24/02* (2009.01)
*H04L 41/046* (2022.01)
(Continued)

(52) U.S. Cl.
CPC ........... *H04W 24/02* (2013.01); *H04L 41/046* (2013.01); *H04L 41/0823* (2013.01);
(Continued)

(58) Field of Classification Search
CPC .. H04W 24/02; H04L 41/046; H04L 41/0823; H04L 41/145; H04L 41/16; H04L 16/18
(Continued)

(56) References Cited

U.S. PATENT DOCUMENTS

2010/0317420 A1\* 12/2010 Hoffberg ............ G06Q 30/0282
463/1
2016/0165478 A1 6/2016 Yao et al.
(Continued)

FOREIGN PATENT DOCUMENTS

CN 101873604 A 10/2010
CN 106507398 A 3/2017
(Continued)

OTHER PUBLICATIONS

European Patent Office. Extended European Search Report for EP Application No. 20834419.2, mailed Jul. 21, 2022, pp. 1-11.
(Continued)

*Primary Examiner* — Ted M Wang
(74) *Attorney, Agent, or Firm* — Vivacqua Crane, PLLC

(57) ABSTRACT

A network optimization method, a device, and a non-transitory computer-readable storage medium are disclosed. The method may include: modeling problems existing in cells in a first region to obtain N agents, a modeling method and a training method, where a proportion of cells in which existing problems belong to a same problem category among the cells contained in the first region is greater than or equal to a preset threshold, geographic locations of the cells contained are consecutive, and an outline of the first region is an outwardly convex figure, and N is an integer greater than or equal to 1; and for each of the agents, determining an initial model of the agent according to the modeling method and the training method, and training the initial model of the agent using a reinforcement learning method according to the modeling method and the training method.

14 Claims, 9 Drawing Sheets

---

700: Model problems existing in cells in a first region to obtain N agents, a modeling method and a training method, where the proportion of cells in which existing problems belong to the same problem category among the cells contained in the first region is greater than or equal to a preset threshold, the geographic locations of the cells contained are consecutive, and an outline of the first region is an outwardly convex figure, and N is an integer greater than or equal to 1

701: For each of the agents, determine an initial model of the agent according to the modeling method and the training method, train the initial model of the agent using a reinforcement learning method according to the modeling method and the training method, and perform network optimization on a cell corresponding to the agent according to the trained model of the agent

(51) Int. Cl.
  *H04L 41/0823* (2022.01)
  *H04L 41/14* (2022.01)
  *H04L 41/16* (2022.01)
  *H04L 43/08* (2022.01)
  *H04W 16/18* (2009.01)

(52) U.S. Cl.
  CPC ............ *H04L 41/145* (2013.01); *H04L 41/16* (2013.01); *H04L 43/08* (2013.01); *H04W 16/18* (2013.01)

(58) Field of Classification Search
  USPC ...................................................... 455/414.1
  See application file for complete search history.

(56) References Cited

U.S. PATENT DOCUMENTS

| | | | |
|---|---|---|---|
| 2019/0014488 A1 | 1/2019 | Tan et al. | |
| 2020/0229069 A1* | 7/2020 | Chun | .................... H04W 76/30 |

FOREIGN PATENT DOCUMENTS

| | | | |
|---|---|---|---|
| CN | 106714239 A | 5/2017 | |
| WO | 2018149898 A2 | 8/2018 | |
| WO | 2019007388 A1 | 1/2019 | |

OTHER PUBLICATIONS

Aliu, et al. "A Survey of Self Organisation in Future Cellular Networks," IEEE Communications Surveys & Tutorials, vol. 15, No. 1, Jan. 2013, pp. 336-361.

Lin et al. "A Machine Learning Assisted Method of Coverage and Capacity Optimization (CCO) in 4G LTE Self Organizing Networks (SON)," IEEE 2019 Wireless Telecommunications Symposium (WTS), Apr. 9, 2019, pp. 1-9.

Japan Patent Office. Notice of Reasons for Refusal for JP Application No. 2021-578169 and English translation, mailed Feb. 24, 2023, pp. 1-11.

International Searching Authority. International Search Report and Written Opinion for PCT Application No. PCT/CN2020/097554 and English translation, mailed Aug. 25, 2020, pp. 1-10.

MUñoz, et al. Fuzzy Rule-Based Reinforcement Learning for Load Balancing Techniques in Enterprise LTE Femtocells, IEEE Transactions on Vehicular Technology, Jun. 5, 2013, pp. 1-12.

Korean Intellectual Property Office. First Office Action for KR Application No. 2021-568931 and English translation, mailed Jan. 14, 2023, pp. 1-9.

* cited by examiner

NETWORK OPTIMIZATION METHOD, DEVICE, AND STORAGE MEDIUM

CROSS-REFERENCE TO RELATED APPLICATION

This application is a national stage filing under 35 U.S.C. § 371 of international application number PCT/CN2020/097554, filed on Jun. 22, 2020, which claims priority to Chinese patent application No. 201910591464.7 filed on Jul. 2, 2019. The contents of these applications are incorporated herein by reference in their entirety.

TECHNICAL FIELD

Embodiments of the present disclosure relate to, but are not limited to, the field of mobile communications, and in particular to a network optimization method and device, and a non-transitory computer-readable storage medium.

BACKGROUND

A self-optimization method applied in a self-organizing network (SON) in long-term evolution (LTE) is usually implemented based on artificially set expert rules. In response to performance indicators of a cell in the network satisfying a certain condition, a certain adjustment action is automatically performed to modify parameters of the cell to achieve the purpose of network self-optimization.

The existing wireless network self-optimization algorithms may be divided into two categories, which are conventional network self-optimization algorithms and artificial intelligence-based network self-optimization algorithms, respectively.

The conventional network self-optimization algorithms mainly rely on a manually developed rule table for network self-optimization, i.e., when self-optimization is started, various network states are queried and adjustments should be made according to the rule table developed by experts. Such a self-optimization method uses the same set of rules for all the apparatuses involved in self-optimization, while in fact, the conditions such as the environment and performance of each base station may be quite different, which leads to mixed results of self-optimization on different apparatuses.

Artificial intelligence-based network self-optimization algorithms introduce artificial intelligence algorithms into the field of network self-optimization. However, in some cases, such algorithms are mostly limited to the laboratory environment, and cannot effectively model the existing network load environments or solve the multi-agent convergence problem caused by the huge number of apparatuses in the existing network, but can only use single-agent models, thus leading to all apparatuses sharing one same agent and failing to achieve adaptive adjustments.

SUMMARY

Embodiments of the present disclosure provide a network optimization method and device that enable adaptive training and/or self-optimization adjustments for different apparatuses, thereby improving the self-optimization effect.

An embodiment of the present disclosure provides a network optimization method, which may include: modeling problems existing in cells in a first region to obtain N agents, a modeling method and a training method, where a proportion of cells in which existing problems belong to a same problem category among the cells contained in the first region is greater than or equal to a preset threshold, geographic locations of the cells contained are consecutive, and an outline of the first region is an outwardly convex figure, and N is an integer greater than or equal to 1; for each of the agents, determining an initial model of the agent according to the modeling method and the training method, and training the initial model of the agent using a reinforcement learning method according to the modeling method and the training method; or performing network optimization on a cell corresponding to the agent according to the trained model of the agent; or determining an initial model of the agent according to the modeling method and the training method, training the initial model of the agent using a reinforcement learning method according to the modeling method and the training method, and performing network optimization on a cell corresponding to the agent according to the trained model of the agent.

An embodiment of the present disclosure provides a network optimization device, which may include a processor and a non-transitory computer-readable storage medium storing instructions which, when executed by the processor, cause the processor to perform any of the above network optimization methods provided by the embodiments of the present disclosure.

An embodiment of the present disclosure provides a non-transitory computer-readable storage medium storing a computer program which, when executed by a processor, cause the processor to perform any of the above network optimization methods provided by the embodiments of the present disclosure.

An embodiment of the present disclosure provides a network optimization device, which may include: a modeling module configured to model problems existing in cells in a first region to obtain N agents, a modeling method and a training method, where a proportion of cells in which existing problems belong to a same problem category among the cells contained in a first region is greater than or equal to a preset threshold, geographic locations of the cells contained are consecutive, and an outline of the first region is an outwardly convex figure, and N is an integer greater than or equal to 1; a training optimization module configured to, for each of the agents, determine an initial model of the agent according to the modeling method and the training method, and train the initial model of the agent using a reinforcement learning method according to the modeling method and the training method; or perform network optimization on a cell corresponding to the agent according to the trained model of the agent; or determine an initial model of the agent according to the modeling method and the training method, train the initial model of the agent using a reinforcement learning method according to the modeling method and the training method, and perform network optimization on a cell corresponding to the agent according to the trained model of the agent.

Additional features and advantages of the embodiments of the present disclosure will be set forth in the subsequent description, and in part will become apparent from the description, or may be learned by practice of the embodiments of the present disclosure. The purposes and other advantages of the embodiments of the present disclosure can be realized and obtained by structures particularly noted in the description, the appended claims and the accompanying drawings.

BRIEF DESCRIPTION OF DRAWINGS

The accompanying drawings are used to provide a further understanding of the technical schemes of the embodiments of the present disclosure and constitute a part of the description. The accompanying drawings are used to explain the technical schemes of the embodiments of the present disclosure together with the embodiments of the present disclosure, and do not constitute a restriction on the technical schemes of the embodiments of the present disclosure, in which.

DETAILED DESCRIPTION

The embodiments of the present disclosure will be described in detail below with reference to the accompanying drawings. It should be noted that any combinations of embodiments and features of the embodiments of the present disclosure without conflict are possible.

The steps shown in the flowcharts of the drawings may be performed in a computer system, such as with a set of computer-executable instructions. Moreover, although a logical order is shown in the flowcharts, the steps shown or described may be performed, in some cases, in a different order than shown or described herein.

The existing wireless network self-optimization algorithms may be divided into two categories, which are conventional network self-optimization algorithms and artificial intelligence-based network self-optimization algorithms, respectively.

For example, the load balancing algorithm disclosed in patent No. CN106714239A uses fixed thresholds and rules, which makes it difficult to make adaptive adjustments for cells with different performance and environments, thus may resulting in poor self-optimization adjustment for cells or base stations with special environment or insufficient apparatus performance.

For another example, in a self-optimization method for load balancing using reinforcement learning proposed in a paper titled "Fuzzy Rule-Based Reinforcement Learning for Load Balancing Techniques in Enterprise LTE Femtocells", algorithmic convergence is achieved on 6 microcells in a 3-story building in a simulated environment, and the benefit of reduction in the call dropping ratio (CDR) is achieved. However, it is only limited to laboratory scenarios where interference is completely excluded and apparatuses have identical performance, and the paper uses only a single-agent model, which is shared by all apparatuses involved in self-optimization, and thus adaptive training and adjustments are difficult to be achieved.

Figure 1:
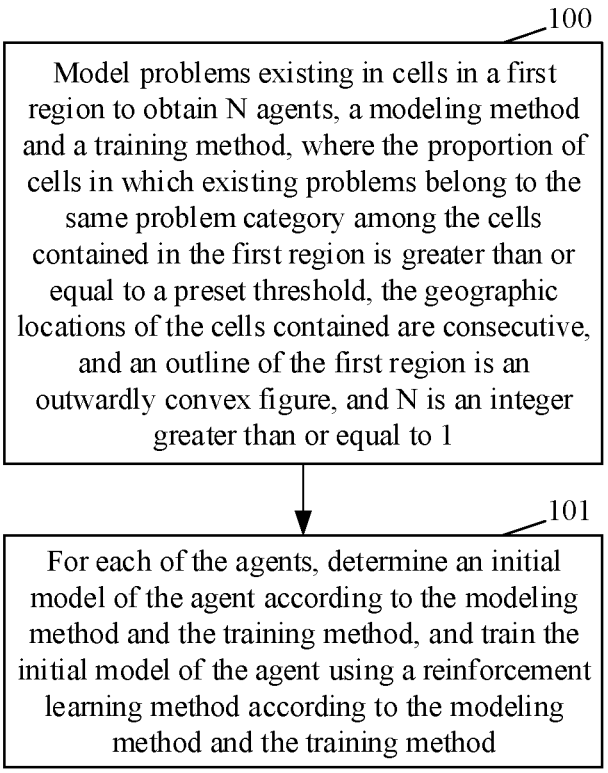
FIG. 1 is a flowchart of a network optimization method proposed in an embodiment of the present disclosure.

Referring to FIG. 1, an embodiment of the present disclosure proposes a network optimization method including the following steps.

At step 100, problems existing in cells in a first region are modeled to obtain N agents, a modeling method and a training method, where the proportion of cells in which existing problems belong to the same problem category among the cells contained in the first region is greater than or equal to a preset threshold, the geographic locations of the cells contained are consecutive, and an outline of the first region is an outwardly convex figure, and N is an integer greater than or equal to 1.

In an embodiment of the present disclosure, the reason for modeling the cells in the first region instead of modeling the cells in the entire network is that the number of cells in the entire network is so large that performing all model training and/or network optimization for all cells may result in a very large computational overhead and may be unnecessary.

In an example, the modeling may be performed in the following manner:

presetting a correspondence between problem categories, modeling methods, and training methods;

searching, in the correspondence, for a modeling method and a training method corresponding to a problem category to which a problem existing in a cell contained in a first region belongs, the searched modeling method and training method being configured to perform modeling and to perform reinforcement learning training on the model, where the modeling method includes: a generation method for the agent, a definition method for the state of the agent, a definition method for an action of the agent, a definition method for a reward function of the agent, and a definition method for an initial policy of the agent for selecting an action; and the training method includes: a method for adjusting, using a reinforcement learning method, an initial policy for selecting an action;

generating N agents according to the generation method for the agent.

In an embodiment of the present disclosure, generating N agents according to the generation method for the agent includes any one or more of the following steps.

When the problems existing in the cells in the first region do not involve collaboration between multiple cells (e.g., a coverage problem), one cell in the first region is used as one agent, where a respective cell correspond to a respective agent; that is to say, N is the number of cells contained in the first region, and the N agents are the N cells contained in the first region, and as shown in FIG. 2(a), assuming that the first region includes cell 1, cell 2, cell 3, cell 4, cell 5, and cell 6, then each cell is used as an independent agent, and there is no overlap among respective agents.

When the problems existing in the cells in the first region involve collaboration between multiple cells (e.g., a capacity problem or a load balancing problem), one cell pair with an adjacency relationship in the first region is used as one agent, where a respective cell pair with an adjacency relationship correspond to a respective agent.

In an example, it is determined whether there is an adjacency relationship between two cells based on the geographic location information for the cells in the first region, the frequency of switching between the cells and the configuration parameters of the cells. For example, in response to the primary adjacent region in the configuration parameters for one of the cells including the other cell and the two cells being geographically adjacent and the frequency of switching between the two cells being the highest, it is determined that there is an adjacency relationship between the two cells; and in response to the two cells being not geographically adjacent, or the frequency of switching between the two cells being not the highest, it is determined that there is no adjacency relationship between the two cells.

For example, as shown in FIG. 2(b), assuming that the first region includes cell 1, cell 2, cell 3, cell 4, cell 5, and cell 6, and the geographic location relationship between the cells is as shown in FIG. 2(b), in which case, cell pair 1-3, cell pair 1-2, and cell pair 1-5 may be used as agents, respectively, and there will be partial overlap between respective agents.

The geographic location information for the cells, the frequency of switching between the cells, and the configuration parameters of the cells may be obtained from the network manager, or directly from the base station.

At step 101, for each of the agents, an initial model of the agent is determined according to the modeling method and the training method, and the initial model of the agent is trained using a reinforcement learning method according to the modeling method and the training method.

In an embodiment of the present disclosure, the performance data of an agent refers to the performance data of a cell corresponding to the agent, and the performance data of the cell may be acquired from the network manager or directly from the base station, and the specific way of acquiring performance data of cells is not limited in the embodiments of the present disclosure.

In an embodiment of the present disclosure, an initial policy of the agent for selecting an action is determined according to the definition method for an initial policy of the agent for selecting an action, and the initial policy of the agent for selecting an action is used as the initial model of the agent.

In an embodiment of the present disclosure, training the initial model of the agent using a reinforcement learning method according to the modeling method and the training method includes:

in an ith round of iteration, in response to a convergence condition being not satisfied, selecting a random action under a first probability and sending the random action, such that the random action takes effect in the cell corresponding to the agent; and optimizing the reinforcement learning method by exploring actions that have not been conducted in the reinforcement learning method, this random action being configured to explore a new optimal solution so as to improve the training accuracy;

determining the state of the agent corresponding to the ith round of iteration under a second probability according to performance data of the agent corresponding to the ith round of iteration and the definition method for the state of the agent, adjusting a policy of the agent adjusted in an (i-1)th round of iteration according to the state of the agent corresponding to the (i-1)th round of iteration, the state corresponding to the ith round of iteration, and the training method, calculating an optimal action of the agent corresponding to the ith round of iteration according to the state of the agent corresponding to the ith round of iteration, first data of the agent, and the definition method for an action of the agent, and sending the optimal action of the agent corresponding to the ith round of iteration such that the optimal action of the agent corresponding to the ith round of iteration takes effect in the cell corresponding to the agent, where the sum of the first probability and the second probability is 1, and i is an integer greater than or equal to 1;

where the first data of the agent includes:
   a policy of the agent which is adjusted in the ith round of iteration;
   alternatively, a policy of the agent which is adjusted in the ith round of iteration and an average action of adjacent agents.

It is noted that in the first round of iteration, the initial policy of the agent is adjusted according to the state of the agent corresponding to the first round of iteration and the training method.

In an example, adjusting the policy of the agent according to the state corresponding to the (i-1)th round of iteration, the state corresponding to the ith round of iteration, and the training method includes: calculating a reward function value corresponding to the (i-1) round of iteration according to the state corresponding to the (i-1)th round of iteration, the state corresponding to the ith round of iteration, and the definition method for a reward function value of the agent, and adjusting the policy of the agent adjusted in the (i-1)th round of iteration according to the reward function value corresponding to the (i-1)th round of iteration.

In an example, when cells are used as agents, for example, for the coverage problem, the reward function value of an agent corresponding to the (i-1)th round of iteration may be calculated based on the coverage situation of the agent corresponding to the (i-1)th round of iteration, and the better the coverage situation, the higher the reward function value. For other problems, the calculation method for the reward function value may vary depending on the problem category.

When cell pairs are used as agents, since not all changes in the state of a cell in an agent are caused by the action of the agent, but may also be affected by the actions of adjacent agents, the reward function value may be calculated based on the number of the adjacent agents, the average action magnitude of the adjacent agents, and the action magnitude of the agent itself, that is, the reward function value corresponding to the (i-1)th round of iteration may be calculated based on the proportion of the state changes among the state changes of all the cells corresponding to this agent that are caused by the action of the agent corresponding to the (i-1)th round of iteration.

Figure 4:
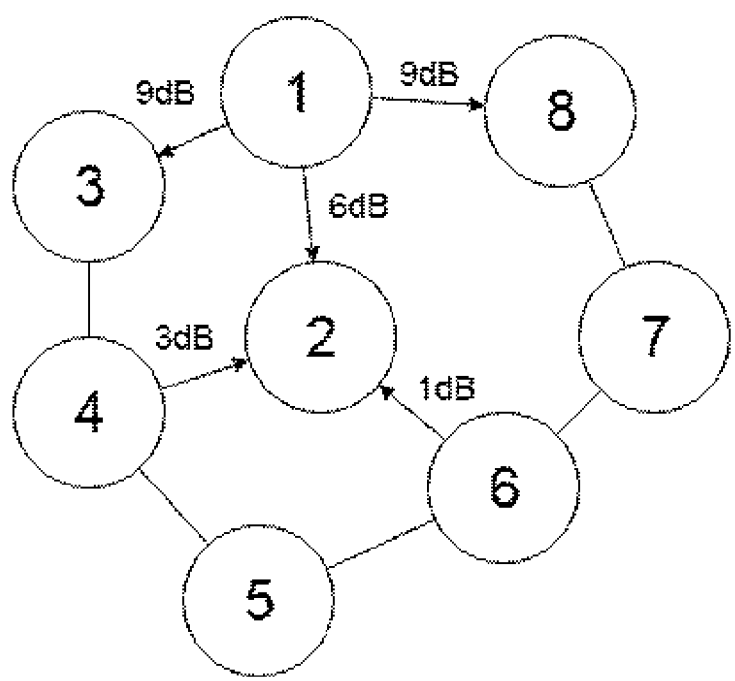
FIG. 4 is a schematic diagram of reward distribution according to an embodiment of the present disclosure.

For example, when load balancing self-optimization is performed, the action is to adjust a switching parameter between cells, cell pairs are used as agents, and the directions and the magnitudes of the actions of cell pair 1-2 and its adjacent agents in a certain round of iteration are as shown in FIG. 4. In FIG. 4, the arrow indicates the switching direction and the text above the arrow indicates the magnitude of the adjustment of the switching parameter, and the users of cell 1 are shunted to other cells, while cell 2 receives users shunted from adjacent regions, then the proportion of state changes among the state changes of cell 1 that are caused by the action of cell pair 1-2 is $R_{1-2/1}$, which is calculated in the following manner:

$$R_{1-2/1} = \frac{a_{1-2}}{\sum a_1} = \frac{a_{1-2}}{a_{1-2} + a_{1-3} + a_{1-8}} = \frac{6}{6+9+9} = 0.25.$$

That is, a proportion of 0.25 of the state changes in cell 1 is caused by the action of cell pair 1-2. Similarly, the proportion of state changes among the state changes in cell 2 that are caused by the action of cell pair 1-2 is calculated, and then the reward function value caused by the action of cell pair 1-2 may be calculated, i.e., the sum of the proportion of state changes among the state changes in cell 1 that are caused by the action of cell pair 1-2 and the proportion of state changes among the state changes of cell 2 that are caused by the action of cell pair 1-2.

Figure 3:
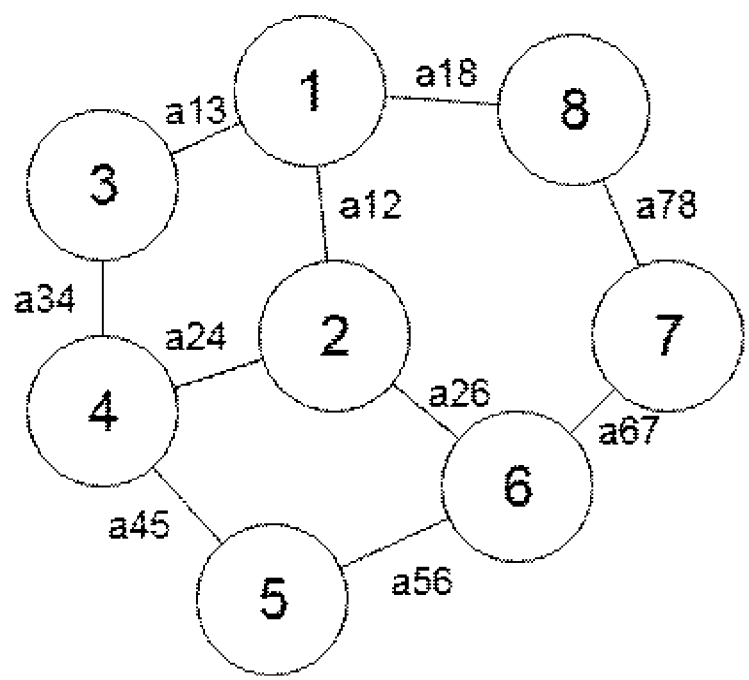
FIG. 3 is a schematic diagram of adjacent agents according to an embodiment of the present disclosure.

In an example, when cells are used as agents, adjacent agents refer to agents of which the corresponding cells are geographically adjacent. As shown in FIG. 3, assuming that the first region includes 8 cells, namely, cell 1, cell 2, cell 3, cell 4, cell 5, cell 6, cell 7 and cell 8, then, since the cells that are geographically adjacent to cell 2 include cell 1, cell 4 and cell 6, the adjacent agents of the agent corresponding to cell 2 include the agents corresponding to cell 1, cell 4 and cell 6. Then, when calculating the average action of the adjacent agents of the agent corresponding to cell 2, the average action of the agents corresponding to cell 1, cell 4 and cell 6 should be calculated.

When cell pairs are used as agents, adjacent agents refer to agents of which intersections of the cells contained in the corresponding cell pairs are non-empty. As shown in FIG. 3, assuming that the first region includes 8 cells, namely cell 1, cell 2, cell 3, cell 4, cell 5, cell 6, cell 7, and cell 8, then for cell pair 1-2, since cell pair 1-2 has non-empty intersections with cells contained in cell pair 1-3, cell pair 1-8, cell pair 2-4, and cell pair 2-6, respectively, the adjacent agents of the agent corresponding cell pair 1-2 include agents corresponding to cell pair 1-3, cell pair 1-8, cell pair 2-4 and cell pair 2-6. Then, when calculating the average action of the adjacent agents of the agent corresponding to cell pair 1-2, the average action of the agents corresponding to cell pair 1-3, cell pair 1-8, cell pair 2-4 and cell pair 2-6 should be calculated, that is, the average value of a13, a18, a24 and a26 should be calculated.

In an example, the average action of adjacent agents may be calculated according to the mean field theory. Specifically, the average action of adjacent agents may refer to the average value of the initial actions of the adjacent agents corresponding to the ith round of iteration calculated based on the states of the adjacent agents corresponding to the ith round of iteration and the policies of the adjacent agents that are adjusted in the ith round of iteration.

Alternatively, it may also refer to the average value of the optimal actions of the adjacent agents corresponding to the ith round of iteration.

In some cases, when calculating the optimal action of a particular agent,
if the optimal actions of the adjacent agents have not yet been calculated, instead of calculating it based on the average action of the adjacent agents, it is calculated based only on the states of the adjacent agents corresponding to the ith round of iteration and the policies of the adjacent agents that are adjusted in the ith round of iteration; or, it is calculated based on the states of the adjacent agents corresponding to the ith round of iteration, the policies of the adjacent agents that are adjusted in the ith round of iteration and the average value of the initial actions of the adjacent agents corresponding to the ith round of iteration;
if only the optimal actions of part of the adjacent agents have been calculated, it is calculated based on the states of the adjacent agents corresponding to the ith round of iteration, the policies of the adjacent agents that are adjusted in the ith round of iteration and the average action of the calculated part of the adjacent agents; or, it is calculated based on the states of the adjacent agents corresponding to the ith round of iteration, the policies of the adjacent agents that are adjusted in the ith round of iteration, the average action of the calculated part of the adjacent agents and the average value of the initial actions of the other adjacent agents corresponding to the ith round of iteration;
if the optimal actions of all the adjacent agents have been calculated, it is calculated based on the states of the adjacent agents corresponding to the ith round of iteration, the policies of the adjacent agents that are adjusted in the ith round of iteration and the average action of all the adjacent agents.

In an embodiment of the present disclosure, since in the wireless network, the cells, the cell pairs, and the base stations have a great influence on each other, i.e., the actions of the agents may have a great influence on each other, which may cause conventional model training to be difficult to converge in the wireless network environment. Based on the mean field theory, the embodiments of the present disclosure simplify the actions of adjacent agents into the average action and takes it into account during calculation, which strengthens the convergence of model training and accelerates the convergence speed.

In an example, the sending of the optimal action or random action of the agent corresponding to the ith round of iteration may be implemented in the following manner:
the optimal action or random action of the agent corresponding to the ith round of iteration is sent to the network manager, and then the network manager modifies the configuration parameter of the cell corresponding to the agent according to the optimal action or random action of the agent corresponding to the ith round of iteration and makes it to take effect;
alternatively, the configuration parameter of the cell corresponding to the agent that needs to be adjusted and the adjustment value are determined according to the optimal action or random action of the agent corresponding to the ith round of iteration, the configuration parameter of the cell corresponding to the agent that needs to be adjusted and the adjustment value are sent to the network manager, and the network manager modifies the configuration parameter of the cell corresponding to the agent according to the configuration parameter of the cell corresponding to the agent that needs to be adjusted and the adjustment value and makes it to take effect;

alternatively, it may also be implemented in other manners.

In another embodiment of the present disclosure, prior to a first round of iteration, the method further includes: storing a configuration parameter of the cell corresponding to the agent; and the method further includes:

in the ith round of iteration, in response to the performance data of the cell corresponding to the agent corresponding to the ith round of iteration not having a deterioration beyond a preset magnitude relative to performance data corresponding to the (i-1)th round of iteration, continuing to perform the step of selecting a random action under the first probability as the optimal action of the agent corresponding to the ith round of iteration; or, the step of determining the state of the agent corresponding to the ith round of iteration under the second probability according to the performance data of the agent corresponding to the ith round of iteration;

in response to the performance data of the agent corresponding to the ith round of iteration having a deterioration beyond a preset magnitude relative to performance data corresponding to the (i-1)th round of iteration, restoring the configuration parameter of the cell corresponding to the agent to the stored configuration parameter.

In an embodiment of the present disclosure, during the model training process, the exploration of new actions may lead to poor adjustment of the network, and the above method allows timely restoration of the original state of the network when the network performance has a deterioration beyond a preset magnitude.

In another embodiment of the present disclosure, prior to generating the agent, the method further includes: determining cells contained in the first region, or, determining the first region.

Specifically, history performance data of all cells in the network is acquired; for each of the cells, it is determined whether the cell is a normal cell or a problematic cell according to history performance data of the cell; cells in which existing problems belong to the same problem category among problematic cells are divided into the same second region; and for each second region, the first region is determined according to a geographic location relationship of cells contained in the second region and the outline of the second region.

In an embodiment of the present disclosure, the history performance data of the cells may be acquired from the network manager or directly from the base station, and the specific way of acquiring history performance data of cells is not limited in the embodiments of the present disclosure.

In an embodiment of the present disclosure, a root cause analysis method may be used to determine whether a cell is a normal cell or a problematic cell based on the history performance data of the cell, and when it is a problematic cell, the problem existing in the problematic cell is determined, and the problematic cell is classified according to the problem category to which the existing problem belongs, so as to obtain a second region corresponding to each problem category, for example, into a capacity problematic cell, a coverage problematic cell, and so on. The root cause analysis method may reuse the existing root cause analysis method in the existing network, and of course, other root cause analysis methods may also be used, and the implementations of the root cause analysis method are not limited in the embodiments of the present disclosure.

In an embodiment of the present disclosure, determining the first region according to a geographic location relationship of cells contained in the second region and the outline of the second region includes any one or more of the following:

in response to the geographic locations of the cells contained in the second region being consecutive and the outline of the second region being an outwardly convex figure, using the second region as the first region;

alternatively, in response to the geographic locations of the cells contained in the second region being non-consecutive, or in response to the outline of the second region being not an outwardly convex figure, adding the second region and a minimum number of cells other than the cells contained in the second region to the first region such that the geographic locations of the cells contained in the first region are consecutive and the outline of the first region is an outwardly convex figure.

In response to the outline of the first region being not an outwardly convex figure, for example, it is an inwardly concave figure, it may lead to poor self-optimization effect, and the evaluation of the effect after self-optimization is not objective, thus leading to poor training effect of the reinforcement learning method. For example, for regions that do not satisfy the condition like those shown in FIG. 5(a), if load balancing self-optimization is performed, users in cell 3 can only be offloaded to cell 4, and the same problem also exists in cell 5 and cell 6. When evaluating the adjustment effect, since cell 1 and cell 2 are not contained in the optimization region, they will not be taken into account during the evaluation, while cell 1 and cell 2 are closely connected to the optimization region (they are surrounded by the optimization target cells), it is possible that the adjustment of the optimization region is at the cost of losing the performance of cell 1 and cell 2, however, since cell 1 and cell 2 are not classified into the optimization region, this effect will be ignored, which will have an impact on the reinforcement learning training.

In an example, other cells added to the first region may be either normal cells or cells with problems belonging to different problem categories than the problem category to which the problems existing in the cells contained in the second region belong. The other cells are added to the first region for better model training and/or network optimization of the problematic cells in the first region.

In an embodiment of the present disclosure, as shown in FIG. 5(a), cell 3, cell 4, cell 5 and cell 6 all have the capacity problem, while cell 1 and cell 2 do not have the capacity problem, then, cell 3, cell 4, cell 5 and cell 6 are divided into the same second region, and since the outline of the second region formed by cell 3, cell 4, cell 5 and cell 6 is an inwardly concave figure, it is necessary to merge cell 1 and 2 into the first region so that the outline of the first region is an outwardly convex figure, as shown in FIG. 5(b).

In the embodiment of the present disclosure, by generating N agents and performing respective model training and/or network optimization for respective agents, the use of multiple agents enables model training and/or network optimization for respective cells (i.e., respective apparatuses), allowing each agent to make self-optimization adjustments that best fit its actual situation in various situations, thus improving the overall self-optimization effect.

Figure 6:
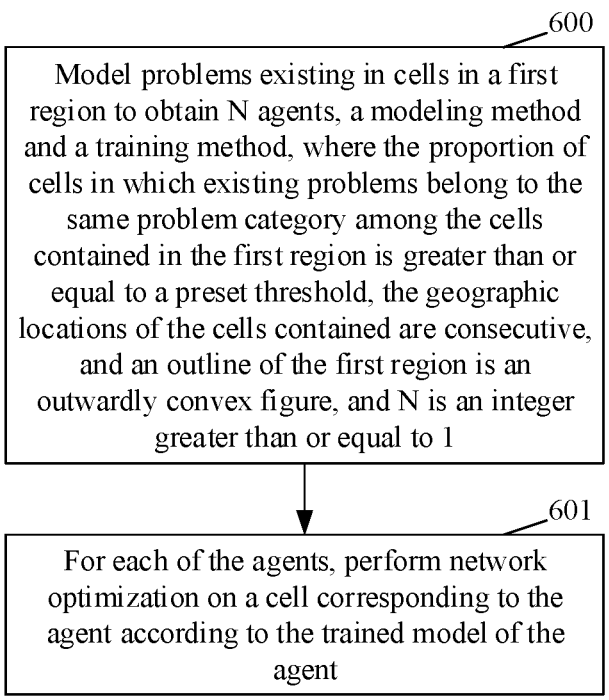
FIG. 6 is a flowchart of a network optimization method proposed in another embodiment of the present disclosure.

Referring to FIG. 6, another embodiment of the present disclosure proposes a network optimization method including the following steps.

At step 600, problems existing in cells in a first region are modeled to obtain N agents, a modeling method and a training method, where the proportion of cells in which existing problems belong to the same problem category among the cells contained in the first region is greater than or equal to a preset threshold, the geographic locations of the cells contained are consecutive, and an outline of the first region is an outwardly convex figure, and N is an integer greater than or equal to 1.

The implementation process of step 600 is the same as the implementation process of step 100 of the previous embodiment and will not be repeated here.

At step 601, for each of the agents, network optimization is performed on a cell corresponding to the agent according to the trained model of the agent.

In an embodiment of the present disclosure, performing network optimization on a cell corresponding to the agent according to the trained model of the agent includes:

in a jth round of iteration, determining the state of the agent corresponding to the jth round of iteration according to performance data of the agent corresponding to the jth round of iteration and the definition method for the state of the agent, calculating an optimal action of the agent corresponding to the jth round of iteration according to the state of the agent corresponding to the jth round of iteration, second data of the agent, and the definition method for an action of the agent, and sending the optimal action of the agent corresponding to the jth round of iteration such that the optimal action of the agent corresponding to the jth round of iteration takes effect in the cell corresponding to the agent, where j is an integer greater than or equal to 1;

where the second data of the agent includes:

a trained policy (i.e., the trained model, i.e., the policy which is adjusted in the last round of iteration) of the agent;

alternatively, a trained policy of the agent and an average action of adjacent agents.

In an embodiment of the present disclosure, the average action of adjacent agents is calculated in the same way as in the previous embodiments and will not be repeated here.

In an embodiment of the present disclosure, the specific process of calculating the optimal action of the agent corresponding to the jth round of iteration is similar to that in the previous embodiments, the only difference being that in the present embodiment there is no need to update the policy of the agent in each round of iteration, but the same policy, i.e., the trained policy, is used in each round of iteration.

In an embodiment of the present disclosure, the performance data of an agent refers to the performance data of a cell corresponding to the agent, and the performance data of the cell may be acquired from the network manager or directly from the base station, and the specific way of acquiring performance data of cells is not limited in the embodiments of the present disclosure.

In another embodiment of the present disclosure, prior to a first round of iteration, the method further includes: storing a configuration parameter of the cell corresponding to the agent; and the method further includes:

in the jth round of iteration, in response to the performance data of the agent corresponding to the jth round of iteration having a deterioration beyond a preset magnitude relative to performance data corresponding to a (j-1)th round of iteration, restoring the configuration parameter of the cell corresponding to the agent to the stored configuration parameter;

in the jth round of iteration, in response to the performance data of the cell corresponding to the agent corresponding to the jth round of iteration not having a deterioration beyond a preset magnitude relative to performance data corresponding to a (j-1)th round of iteration, continuing to perform the step of calculating the optimal action of the agent corresponding to the jth round of iteration according to the state of the agent corresponding to the jth round of iteration and the second data of the agent.

In another embodiment of the present disclosure, prior to generating the agent, the method further includes: determining cells contained in the first region, or, determining the first region.

In an embodiment of the present disclosure, the method for determining the first region is the same as that in the previous embodiments and will not be repeated herein.

In the embodiment of the present disclosure, by generating N agents and performing respective model training and/or network optimization for respective agents, the use of multiple agents enables model training and/or network optimization for respective cells (i.e., respective apparatuses), allowing each agent to make self-optimization adjustments that best fit its actual situation in various situations, thus improving the overall self-optimization effect.

Figure 7:
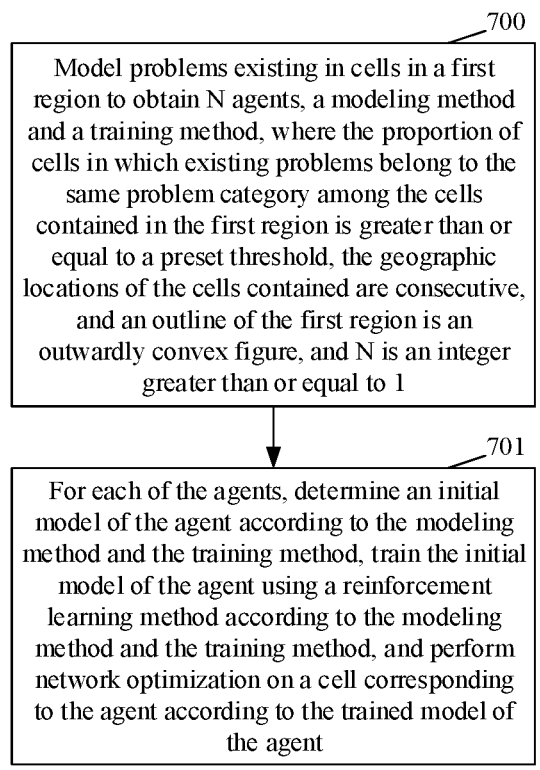
FIG. 7 is a flowchart of a network optimization method proposed in another embodiment of the present disclosure.

Referring to FIG. 7, another embodiment of the present disclosure proposes a network optimization method including the following steps.

At step 700, problems existing in cells in a first region are modeled to obtain N agents, a modeling method and a training method, where the proportion of cells in which existing problems belong to the same problem category among the cells contained in the first region is greater than or equal to a preset threshold, the geographic locations of the cells contained are consecutive, and an outline of the first region is an outwardly convex figure, and N is an integer greater than or equal to 1.

The implementation process of step 700 is the same as the implementation process of step 100 of the previous embodiment and will not be repeated here.

At step 701, for each of the agents, an initial model of the agent is determined according to the modeling method and the training method, the initial model of the agent is trained using a reinforcement learning method according to the modeling method and the training method, and network optimization is performed on a cell corresponding to the agent according to the trained model of the agent.

In an embodiment of the present disclosure, the implementation process of determining the initial model of the agent according to the modeling method and the training method, and training the initial model of the agent using the reinforcement learning method according to the modeling method and the training method is the same as the implementation process of step 101 of the previous embodiment, and will not be repeated here.

The process of performing network optimization on the cell corresponding to the agent according to the trained model of the agent is the same as the implementation process of step 601 of the previous embodiment, the only difference being that j is an integer greater than or equal to (M+1), and M being the maximum number of rounds of iteration for model training.

In another embodiment of the present disclosure, prior to generating the agent, the method further includes: determining cells contained in the first region, or, determining the first region.

In an embodiment of the present disclosure, the method for determining the first region is the same as that in the previous embodiments and will not be repeated herein.

In the embodiment of the present disclosure, by generating N agents and performing respective model training and/or network optimization for respective agents, the use of multiple agents enables model training and/or network optimization for respective cells (i.e., respective apparatuses), allowing each agent to make self-optimization adjustments that best fit its actual situation in various situations, thus improving the overall self-optimization effect.

Two examples are given below to illustrate in detail the implementation process of the network optimization method of the embodiments of the present disclosure. The examples are given for illustrative purposes only and are not intended to limit the scope of protection of the embodiments of the present disclosure.

Example One

Figure 11:
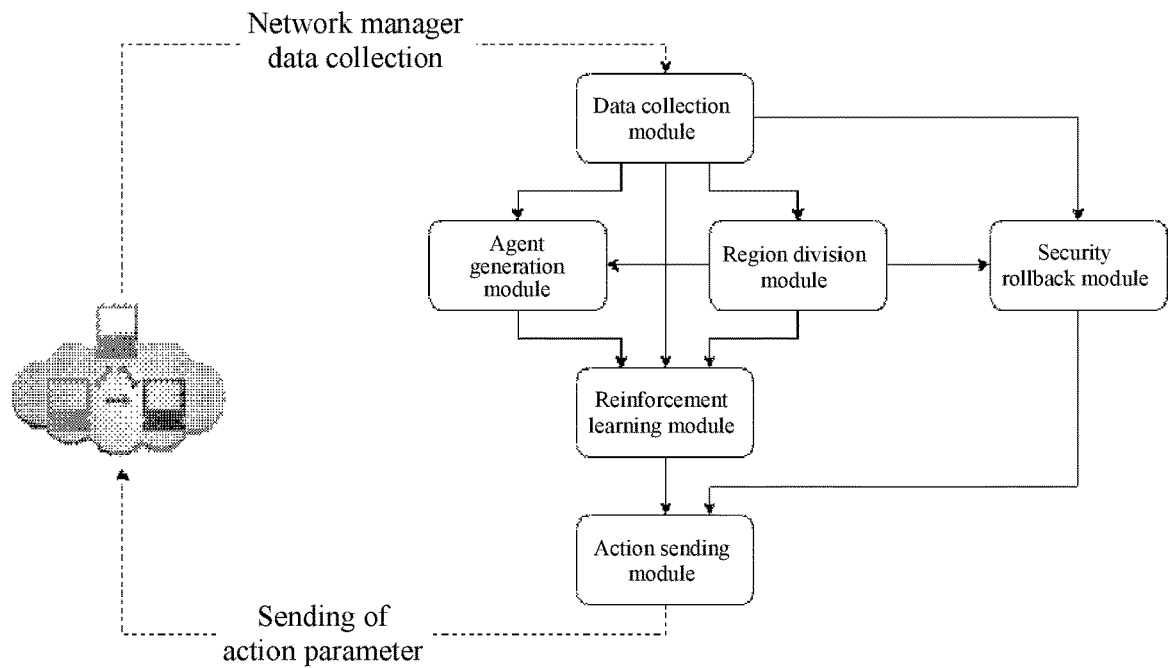
FIG. 11 is a schematic diagram of the structural composition of an example of a network optimization device proposed in an embodiment of the present disclosure.

At step 1, a server is built and is connected to the network manager system, and the module of the algorithm as shown in FIG. 11 are deployed on the server.

At step 2, a data collection module acquires history performance data of all cells in the network from the network manager, and a region division module analyzes the history performance data of all the cells and divides a problematic region (i.e., the first region); the real-time performance data of all cells in the problematic region is acquired from the network manager, and other data, such as data of switching (including the frequency of switching) and configuration parameters, may also be acquired from the network manager. In this example, the problematic region A is taken as an example, which contains 20 cells and has the problem of load imbalance, and the loads among the cells in the region vary greatly.

At step 3, an agent generation module acquires the data obtained by the data collection module and the problematic region result divided by the region division module. The agent generation module determines, based on the above data, that the problem existing in the problematic region involves collaboration between multiple cells, cell pairs are selected as agents, and a list of cell pairs in the problematic region, i.e., a list of agents, is calculated based on the data such as the data of switching between cells and geographic location information for the cells. In addition, the adjacency relationship between the agents is stored.

At step 4, a security rollback module acquires the outputs of the data collection module and the region division module, records all configuration parameters of the problematic region before optimization, and initiates monitoring of key indicators of the target region. In the present embodiment, the problematic region has the problem of load imbalance, then the switching parameter between cell pairs in the problematic region will be optimized, so the monitored data indicators include the switching record data of the cells, the overall switching record of the region, the average channel quality indicators (CQIs) of the cells, the signal to interference plus noise ratio (SINR) of the service users, and other indicators. When these related indicators deteriorate significantly, the reinforcement learning iteration is suspended, and a parameter sending module is notified to stop sending the reinforcement learning action and to send the previously stored original configuration parameters of the problematic region.

At step 5, a reinforcement learning module acquires data provided by other modules. Before the first round of iteration starts, the reinforcement learning module models the problem based on the information provided by the other modules.

In this example, the problematic region has the problem of load imbalance, so the reinforcement learning module defines the adjustment means as load balancing.

The agent generation module has output the result of agent division: cell pairs are used as agents, and the list of agents (i.e., the list of cell pairs) in the problematic region has been output.

The adjustment action is defined as modifying the switching parameters (mainly the cell individual offset (OCN) of adjacent regions) between the 2 cells in the agent.

The state of the cell pair is defined to include the difference in physical resource block (PRB) utilization between the 2 cells in the cell pair, the difference in the number of active users between the 2 cells, and the average CQI of the 2 cells.

Here, the difference in PRB utilization and the difference in the number of active users are used to characterize the degree of load imbalance in an agent, while the average CQI characterizes the average channel quality level of the users in it. The objective of reinforcement learning in this example is to improve the first two indicators characterizing the degree of load imbalance as much as possible without significantly deteriorating CQI.

The reward function of the agent is defined as follows:

$$R = \alpha R_{agent} + R_{global},$$

where $R_{agent}$ is the reward value of the agent itself, R is the reward function value of the agent, $\alpha$ is the weight coefficient of the reward value of the agent itself, $\beta$ is the weight coefficient of the global reward value, $R_{global}$ is the global reward value, and $R_{agent}$ is calculated according to the state change of the agent, which is calculated in the following manner:

$$R_{agent} = a_1 f_1(PRB_1 - PRB_2) + a_2 f_2(AU_1 - AU_2) + a_3 f_3(CQI' - CQI),$$

where in the first item, $f_1(PRB_1 - PRB_2)$ calculates whether the difference in PRB utilization is less than a certain set threshold, and if so, it means that the difference in PRB utilization is not significant and this part of reward is calculated according to this value; in the second item, function $f_2(AU_1 - AU_2)$ f2 calculates whether the difference in the number of active users is less than a threshold, and if so, it means that the difference in load is not significant, and the reward is calculated; and in the third item, function $f_3(CQI' - CQI)$ f3 calculates the change in CQI, and if the CQI deteriorates significantly after one adjustment, it means that too many users have been transferred to cells with poor signal quality, in which case this part of penalty is calculated. For the above three items, their proportions in reward are configured through three coefficients a1, a2 and a3. In addition, $R_{global}$ is the global reward value, which enables multiple agents in the region to collaborate through the global reward, which is calculated in the following manner:

$$R_{global} = b_1 f_4(PRB_{std}, AU_{std}) + b_2 f_5(\Delta CQI_{avg}) + b_3 f_6(\Delta HO),$$

where in the first item, function $f_4(PRB_{std}, AU_{std})$ f4 calculates the change in the standard deviation of PRB utilization and the standard deviation of the number of active users in the region, and decreases in these two standard deviations indicate a more balanced load in the region, in which case the reward is calculated by magnitude; in the second item, function $f_5$ ($\Delta CQI_{avg}$) f5 calculates the change in overall CQI in the region, and the overall deterioration of CQI in the region indicates that a large number of users are adjusted to cells with poor signals, in which case a penalty is calculated; and in the third item, $f_6(\Delta HO)$ f6 calculates the overall number of switches in the region and calculates the penalty when the overall number of switches in the region rises significantly. For the above three items, their proportions in the overall reward are configured by means of three coefficients b1, b2, and b3. In this example, cell pairs are used as agents, so there is a problem of reward distribution in the calculation of reward, and the problem is solved by calculating the proportion coefficients.

Figure 8:
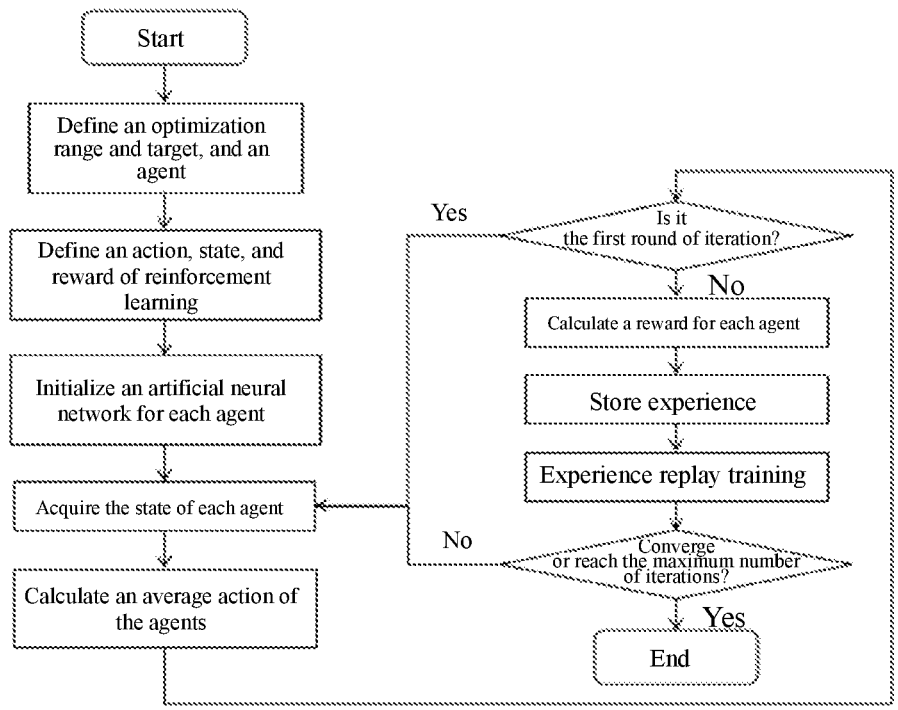
FIG. 8 is a flowchart of model training using a Deep Q-Learning (DQN) algorithm according to an embodiment of the present disclosure.

At step 6, the reinforcement learning module starts reinforcement learning iterative calculation after modeling the problem. In the present embodiment, the DQN reinforcement learning algorithm is used for iterative training, and the iterative process is as shown in FIG. 8. In each round of iteration, the algorithm acquires the current state of the agent and uses the policy network of each agent to calculate the optimal action in that state; in addition, there is a certain probability to select a random action for exploring a new good solution. The sent action for each agent is calculated in combination with the average action around it. In each round of iteration, in addition to calculating and sending the current action, for each agent, the algorithm calculates the difference between its state in the previous round of iteration and the current state, and calculates the reward accordingly. In combination with the action of this agent in the previous round of iteration, a quaternion (S, A, R, S') (i.e., state, action, reward, next state) required for reinforcement learning iterations is obtained, and the DQN algorithm stores the quaternion to an experience replay base of this agent, and performs experience replay training on the neural network of each agent. The agent actions generated through reinforcement learning in the present embodiment, as described in step 5, are the switching parameters (mainly OCN) in the cell pair.

At step 7, an action sending module receives the action parameters of the agent output by the reinforcement learning module and sends them to the network manager. It is one round of iteration from step 6 until the action parameters are sent and take effect. Return to step 6 for circular iterations until the convergence condition of the DQN algorithm is satisfied.

At step 8, After the iterations reach convergence, the iterations no longer calculate rewards or modify the parameters of the neural network, and also stop using random actions for exploration in the iterations. In each round of iteration, the states of the agents are collected, the trained policy network is used to calculate the action, and the sent action is calculated in combination with the average action and sent to the network manager for optimization and adjustment.

Example Two

At step 11, a server is built and is connected to the network manager system, and the module of the algorithm as shown in FIG. 11 are deployed on the server.

At step 12, a data collection module acquires history performance data of all cells in the network from the network manager, and a region division module analyzes the history performance data of all the cells and divides a problematic region (i.e., the first region); the real-time performance data of all cells in the problematic region is acquired from the network manager, and other data, such as data of switching (including the frequency of switching) and configuration parameters, may also be acquired from the network manager. In this example, the problematic region B is taken as an example, which contains 12 cells and has a coverage problem, where some users suffer from poor signals, so the antenna down-tilt angle and transmitting power of the cells need to be adjusted.

At step 13, the agent generation module acquires the result output by the region division module; the problematic region has a coverage problem and the antenna down-tilt angle and transmitting power of the cells need to be adjusted; and cells are defined as agents and a list of agents (list of cells) in the region is output. In addition, the agent generation module also calculates the adjacency relationship between agents, in the present embodiment, the adjacency relationship between cells, which is calculated based on the overlapping coverage as well as the geographic location information output by the region division module.

At step 14, the security rollback module acquires and stores the current configuration parameters from the data collection module. The monitoring of the performance indicators of the region is started, where the monitored indicators include the reference signal received power (RSRP) values of users residing in the region in the measurement report (MR) data, and the average CQI of cells in the region and the throughput rate of the cells in the network manager performance data. When the deterioration of the performance indicators of the region exceeds a set threshold, reinforcement learning adjustment is suspended and the stored original configuration parameters are sent.

At step 15, the reinforcement learning module models the problem scenario before the start of the first round of iteration.

The results output from the region division module and the agent generation module are received, the coverage problem needs to be solved, and each cell is used as an agent.

The state of the agent is defined to include the average RSRP of users in the cell (from the MR data statistics), the average CQI of the cell, the throughput rate of the cell, and the current transmitting power and current antenna down-tilt angle of the cell.

The action of the agent is defined to include adjusting the antenna down-tilt angle of the cell, and adjusting the transmitting power of the cell.

The rewards of the agent are defined to include 2 parts, namely, the individual reward and the overall reward, where the individual reward includes the degree of improvement in the average RSRP of the users residing in the agent, the degree of improvement in the average CQI of the cell, the magnitude of increase in the throughput rate of the cell, and further includes a penalty item, i.e., antenna down-tilt: the magnitude of increase in the transmitting power of the cell, and the respective proportions of the above 4 items are adjusted by means of 4 configurable coefficients; and the overall reward characterizes the overall situation of the optimization region and includes the average RSRP change of all users in the region, the average CQI change of all cells in the region, the overall throughput rate change of the region, and the overall transmit power change of the region, where the first three are used to calculate the reward, while the transmitting power change is used to calculate the penalty value. This reward design allows the reinforcement learning algorithm to improve the coverage situation in the region with minimal increase in the transmitting power.

At step 16, the reinforcement learning module starts iterative training after completing the modeling. In the present embodiment, the implementation using the DQN reinforcement learning algorithm is taken as an example. The process of the DQN implementation of the present embodiment is as shown in FIG. 8. The modeling part has been completed in step 15. The DQN algorithm initializes the policy neural network for each agent. After the iteration starts, in each round of iteration, for each agent there is a certain probability to take a random action, otherwise, an optimal action is generated through its policy network based on the state of that agent, and in combination with the average action around that agent, its sent action is determined. The calculation range for the average action is determined in accordance with the adjacency relationship between the agents generated by the agent generation module. In each round of iteration, for an agent, the algorithm collects the state of the previous iteration, the action of the previous iteration, the current state, and calculates its action reward and obtains the quaternion data required for reinforcement learning iterative training, and adds the data to an experience base of the respective agent. The DQN algorithm uses the experience base of each agent to perform experience replay training on the neural network of the respective agent.

At step 17, the action sending module receives the action output by the reinforcement learning module and integrates and backfills the action data into the parameter table and sends it to the network manager. When a rollback instruction is received from the security rollback module, the action sending module stops sending all actions generated by the reinforcement learning module and immediately sends the original configuration parameters stored by the security rollback module. Steps 16 and 17 are one iteration, and the process returns to step 16 to iterate until the DQN algorithm converges.

At step 18, after the DQN algorithm reaches the convergence condition, the iterations are no longer trained. That is, when generating actions, no random action is used, and all actions are the optimal actions that are generated in combination with the average actions through the policy network based on the state. Moreover, instead of performing reward calculation and updating neural network parameters in each round of iteration, only the sending of the optimal action is performed.

Figure 15:
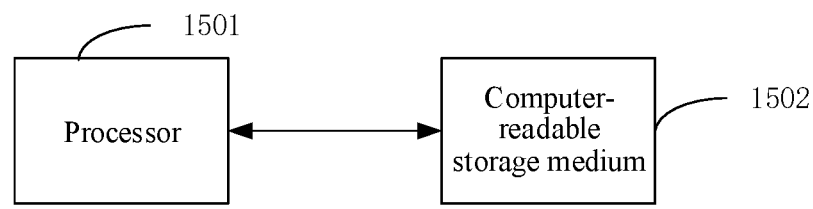
FIG. 15 is a schematic diagram of the structural composition of a network optimization device proposed in another embodiment of the present disclosure.

Another embodiment of the present disclosure proposes a network optimization device, as shown in FIG. 15, including a processor 1501 and a non-transitory computer-readable storage medium 1502, where the non-transitory computer-readable storage medium 1502 has instructions stored therein, which, when executed by the processor 1501, implement any of the above network optimization methods.

Figure 9:
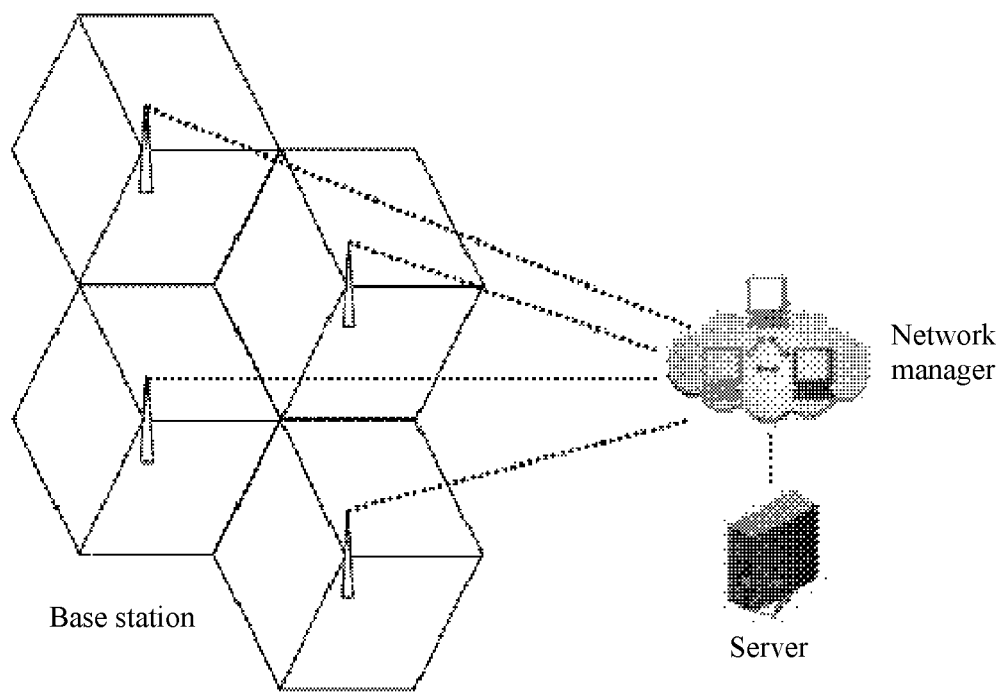
FIG. 9 is a schematic diagram of the deployment structure of a network optimization device according to an embodiment of the present disclosure.

As shown in FIG. 9, the network optimization device of the embodiments of the present disclosure may be provided in a server connected to the network manager or may be a standalone apparatus in the network, and the embodiments of the present disclosure do not limit the specific form of existence of the network optimization device.

Another embodiment of the present disclosure proposes a non-transitory computer-readable storage medium which stores a computer program thereon, where the computer program, when executed by a processor, cause the processor to perform any of the above network optimization methods.

Figure 10:
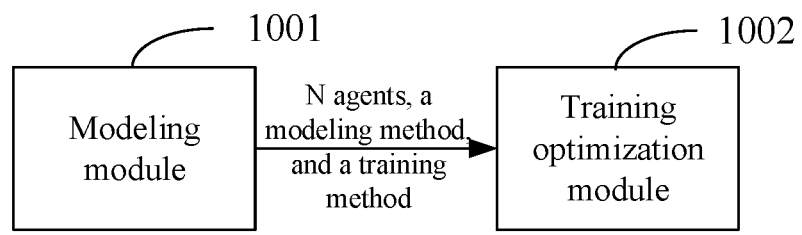
FIG. 10 is a schematic diagram of the structural composition of a network optimization device proposed in another embodiment of the present disclosure.

Referring to FIG. 10, another embodiment of the present disclosure proposes a network optimization device including the following modules.

A modeling module 1001 is configured to model problems existing in cells in a first region to obtain N agents, a modeling method and a training method, where the proportion of cells in which existing problems belong to the same problem category among the cells contained in the first region is greater than or equal to a preset threshold, the geographic locations of the cells contained are consecutive, and an outline of the first region is an outwardly convex figure, and N is an integer greater than or equal to 1.

A training optimization module 1002 is configured to, for each of the agents, determine an initial model of the agent according to the modeling method and the training method, and train the initial model of the agent using a reinforcement learning method according to the modeling method and the training method; or performing network optimization on a cell corresponding to the agent according to the trained model of the agent; or determining an initial model of the agent according to the modeling method and the training method, training the initial model of the agent using a reinforcement learning method according to the modeling method and the training method, and performing network optimization on a cell corresponding to the agent according to the trained model of the agent.

In an embodiment of the present disclosure, the modeling module 1001 is configured to:
  search, in a preset correspondence between problem categories, modeling methods and training methods, for a modeling method and a training method corresponding to a problem category to which a problem existing in a cell contained in the first region belongs,
  where the modeling method includes: a generation method for the agent, a definition method for the state of the agent, a definition method for an action of the agent, a definition method for a reward function of the agent, and a definition method for an initial policy of the agent for selecting an action; and the training method includes: a method for adjusting, using a reinforcement learning method, an initial policy for selecting an action;
  generate N agents according to the generation method for the agent.

In an embodiment of the present disclosure, the modeling module 1001 is further configured to:
  acquire history performance data of all cells in a network;
  determine, for each of the cells, whether the cell is a normal cell or a problematic cell according to history performance data of the cell;
  divide, into the same second region, cells in which existing problems belong to the same problem category among problematic cells;
  determine, for each second region, the first region according to a geographic location relationship of cells contained in the second region and the outline of the second region.

In an embodiment of the present disclosure, the modeling module 1001 is configured to implement the determination of the first region according to the geographic location relationship of the cells contained in the second region and the outline of the second region in any one or more of the following manners:
  in response to the geographic locations of the cells contained in the second region being consecutive and the outline of the second region being an outwardly convex figure, using the second region as the first region;
  alternatively, in response to the geographic locations of the cells contained in the second region being non-consecutive, or in response to the outline of the second region being not an outwardly convex figure, adding the second region and a minimum number of cells other than the cells contained in the second region to the first region such that the geographic locations of the cells contained in the first region are consecutive and the outline of the first region is an outwardly convex figure.

In an embodiment of the present disclosure, the modeling module 1001 is configured to implement the generation of the N agents according to the generation method for an agent in any one or more of the following manners:

when the problems existing in the cells in the first region do not involve collaboration between multiple cells, using one cell in the first region as one agent, where a respective cell correspond to a respective agent;

alternatively, when the problems existing in the cells in the first region involve collaboration between multiple cells, using one cell pair with an adjacency relationship in the first region as one agent, where a respective cell pair with an adjacency relationship correspond to a respective agent.

In an embodiment of the present disclosure, the training optimization module 1002 is configured to implement the determination of a model for the agent according to the modeling method and the training method in the following manner: determining, according to the definition method for a policy of the agent for selecting an action, a policy of the agent for selecting an action, and using the policy of the agent for selecting an action as the model of the agent.

The training optimization module 1002 is configured to implement the training of the model of the agent using the reinforcement learning method in the following manner:

in an ith round of iteration, in response to a convergence condition being not satisfied, selecting a random action under a first probability and sending the random action, such that the random action takes effect in the cell corresponding to the agent;

determining the state of the agent corresponding to the ith round of iteration under a second probability according to performance data of the agent corresponding to the ith round of iteration and the definition method for the state of the agent, adjusting a policy of the agent adjusted in an (i-1)th round of iteration according to the state of the agent corresponding to the (i-1)th round of iteration, the state corresponding to the ith round of iteration, and the training method, calculating an optimal action of the agent corresponding to the ith round of iteration according to the state of the agent corresponding to the ith round of iteration, first data of the agent, and the definition method for an action of the agent, and sending the optimal action of the agent corresponding to the ith round of iteration such that the optimal action of the agent corresponding to the ith round of iteration takes effect in the cell corresponding to the agent, where the sum of the first probability and the second probability is 1, and i is an integer greater than or equal to 1; and where the first data of the agent includes:

a policy of the agent which is adjusted in the ith round of iteration;

alternatively, a policy of the agent which is adjusted in the ith round of iteration and an average action of adjacent agents.

In an embodiment of the present disclosure, the training optimization module 1002 is configured to implement the adjusting of a policy of the agent adjusted in an (i-1)th round of iteration according to the state corresponding to the (i-1)th round of iteration, the state corresponding to the ith round of iteration, and the training method in the following manner: calculating a reward function value corresponding to the (i-1) round of iteration according to the state corresponding to the (i-1)th round of iteration, the state corresponding to the ith round of iteration, and the definition method for an action of the agent, and adjusting the policy of the agent adjusted in the (i-1)th round of iteration according to the reward function value corresponding to the (i-1)th round of iteration.

In an embodiment of the present disclosure, the training optimization module 1002 is further configured to: in the ith round of iteration, in response to the performance data of the cell corresponding to the agent corresponding to the ith round of iteration not having a deterioration beyond a preset magnitude relative to performance data corresponding to the (i-1)th round of iteration, continue to perform the step of selecting a random action under the first probability as the optimal action of the agent corresponding to the ith round of iteration; or, the step of determining the state of the agent corresponding to the ith round of iteration under the second probability according to the performance data of the agent corresponding to the ith round of iteration.

In an embodiment of the present disclosure, the training optimization module 1002 is further configured to:

store a configuration parameter of the cell corresponding to the agent prior to the first round of iteration; and in the ith round of iteration, in response to the performance data of the agent corresponding to the ith round of iteration having a deterioration beyond a preset magnitude relative to performance data corresponding to the (i-1)th round of iteration, restore the configuration parameter of the cell corresponding to the agent to the stored configuration parameter.

In an embodiment of the present disclosure, the training optimization module 1002 is configured to implement the performing of network optimization on a cell corresponding to the agent according to the trained model of the agent in the following manner:

in a jth round of iteration, determining the state of the agent corresponding to the jth round of iteration according to performance data of the agent corresponding to the jth round of iteration and the definition method for the state of the agent, calculating an optimal action of the agent corresponding to the jth round of iteration according to the state of the agent corresponding to the jth round of iteration, second data of the agent, and the definition method for an action of the agent, and sending the optimal action of the agent corresponding to the jth round of iteration such that the optimal action of the agent corresponding to the jth round of iteration takes effect in the cell corresponding to the agent, where j is an integer greater than or equal to 1 or an integer greater than or equal to (M+1), M being the maximum number of rounds of iteration for model training;

where the second data of the agent includes:

a trained policy of the agent;

alternatively, a trained policy of the agent and an average action of adjacent agents.

In an embodiment of the present disclosure, the optimization module 1002 is further configured to: in the jth round of iteration, in response to the performance data of the cell corresponding to the agent corresponding to the jth round of iteration not having a deterioration beyond a preset magnitude relative to performance data corresponding to a (j-1)th round of iteration, continue to perform the step of calculating the optimal action of the agent corresponding to the jth round of iteration according to the state of the agent corresponding to the jth round of iteration and the second data of the agent.

In an embodiment of the present disclosure, the optimization module 1002 is further configured to:
  store a configuration parameter of the cell corresponding to the agent prior to the first round of iteration;
  in the jth round of iteration, in response to the performance data of the agent corresponding to the jth round of iteration having a deterioration beyond a preset magnitude relative to performance data corresponding to a (j-1)th round of iteration, restore the configuration parameter of the cell corresponding to the agent to the stored configuration parameter.

The implementation process of the above network optimization device is the same as the implementation process of the network optimization method of the previous embodiments and will not be repeated here.

In an example, as shown in FIG. 11, the network optimization device of the embodiment of the present disclosure includes:

(1) The present disclosure performs parameter optimization for a wireless network based on multi-agent reinforcement learning, with the main program being deployed on a server. Real-time network manager performance data is acquired from the network manager, and an optimization action is generated and sent to the network manager, and the deployment structure is as shown in FIG. 9.

(2) The network optimization device of the embodiment of the present disclosure includes the following main modules: a data collection module, an agent generation module, a region division module, a reinforcement learning module, an action sending module, and a security rollback module, as shown in FIG. 11. Here, the reinforcement learning module is the core of this algorithm.

(3) The data collection module is the input to the entire algorithm, which acquires data from the network manager (alternatively, the source of data may not be limited to the network manager) and provides data to other modules, including cell performance data, data of switching, configuration parameters, and other data.

(4) The region division module is responsible for dividing a self-optimization target region. Since the number of cells in the existing network is very large, the computational overhead for each type of self-optimization training for all cells is huge and unnecessary. The region division module is responsible for dividing problematic regions from the wireless network. The subsequent self-optimization algorithm based on reinforcement learning is performed in the problematic region output by the region division module.

Figure 5:
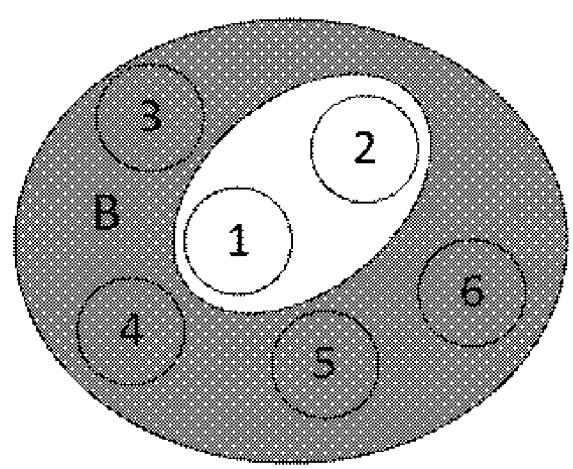
FIG. 5(a) is a schematic diagram of dividing, into the same second region, cells in which existing problems belong to the same problem category among problematic cells according to an embodiment of the present disclosure.
FIG. 5(b) is a schematic diagram of a first region determined based on the second region in FIG. 5(a) according to an embodiment of the present disclosure.
Figure 5:
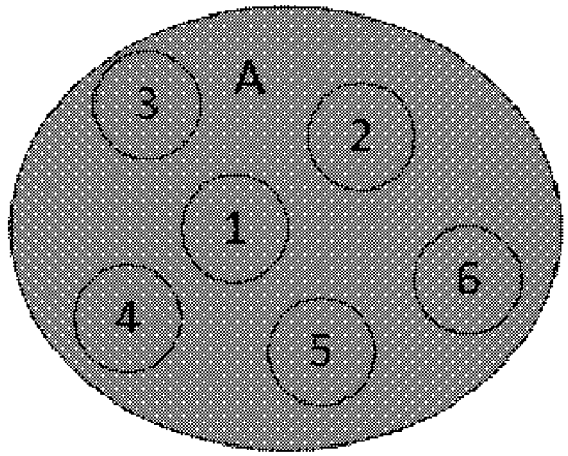

The process of this module is divided into three main steps: history data aggregation, root cause analysis, and geographic location analysis. First, in the history data aggregation, the history data of each cell in the network is collected and stored. Second, in the root cause analysis, all cells are divided into problematic cells and normal cells according to the history data of the cells, and the problematic cells are classified according to the problem categories, such as capacity problematic cells, coverage problematic cells, etc. The root cause analysis part may reuse the existing root cause analysis methods in the existing network (other root cause analysis methods may also be selected). Third, in the geographic location analysis, according to the categories and the location distribution of problematic cells, a problematic region is divided in combination with the map, where the problematic region divided is required to be geographically consecutive. As shown in FIG. 5(*a*) and FIG. 5(*b*), cells 1, 2, 3, 4, 5, and 6 are geographically adjacent, and when there is a capacity problem in cells 3, 4, 5, and 6, the problematic region should be divided as A, which contains cell 1 and cell 2, so that the problematic region is geographically consecutive, and should not be divided in such a way that the region is geographically non-consecutive as in B. The region division module finally outputs the problematic region, and the result of root cause analysis of the problematic region. The region division module can locate the problematic region and narrow the range of reinforcement learning self-optimization, thus reducing the time and computational overhead caused by unnecessary training.

Figure 2:
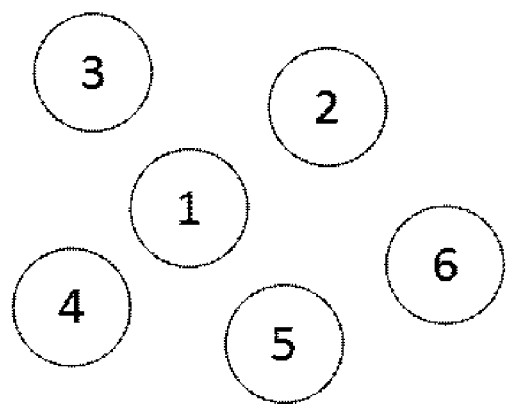
FIG. 2(a) is a schematic diagram of using cells in a first region as agents according to an embodiment of the present disclosure.
FIG. 2(b) is a schematic diagram of using cell pairs in a first region as agents according to an embodiment of the present disclosure.
Figure 2:
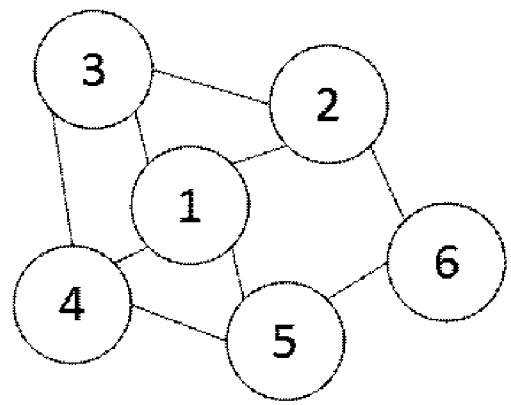

(5) The agent generation module is responsible for generating agents. The agent generation module acquires the network manager data output by the data collection module and the problematic region and its existing problem that are output by the region division module. The agent generation module selects to use cells or cell pairs as agents according to the problem existing in the problematic region. Cell pairs are used as agents when the problems existing in the problematic region involve collaboration between multiple cells, while cells are used as agents when the problems existing in the problematic region do not involve collaboration between multiple cells. When cells are used as agents, the agents output by the agent generation module are the cells contained in the problematic region; and when cell pairs are used as agents, the agents output by the agent generation module are the cell pairs contained in the problematic region. When using cells and cell pairs as agents, respectively, the relationship between agents is as shown in FIG. 2(*a*) and FIG. 2(*b*). After that, the agent generation module calculates the adjacency relationship between the cells based on data such as the location information for the cells, the switching relationship between the cells, and parameter configuration, and generates a list of cell pairs.

(6) (Optional) The security rollback module is the security measure of the algorithm. At the beginning of the running of the algorithm and before the first round of adjustment, the security rollback module records and stores all the network manager configuration parameters involved in the algorithm. During the iterative adjustment of the algorithm, the security rollback module continuously monitors the performance parameter of the optimization region, and when there is a deterioration of performance beyond a preset magnitude, the security rollback module terminates the sending of an optimization action for the optimization region and restores the region configuration parameter to the stored pre-adjustment configuration parameter. The reinforcement learning algorithm may possibly cause the network to be poorly adjusted due to exploration of new actions, and the security rollback module may restore the original state of the network as soon as there is a deterioration of the network performance beyond a threshold.

(7) The reinforcement learning module is the core module of this method. The 2 main steps of the reinforcement learning module are multi-agent modeling of the problematic region and iterative training of all the agents in the region, respectively.

The reinforcement learning module first receives the output of the region division module, obtains a problematic region (containing several cells) and the problem existing in that problematic region, and determines the self-optimization target based on the main problem in the region. The reinforcement learning module obtains a list of target cells for self-optimization from the region division module, and acquires, from the agent generation module, agent information including whether cells or cell pairs are used as agents and a list of agents. All cell pairs in the region together constitute a multi-agent scenario. After defining the agent, the reinforcement learning module defines the state of the agent, the adjustment action, and the reward function according to the problem category.

Figure 12:
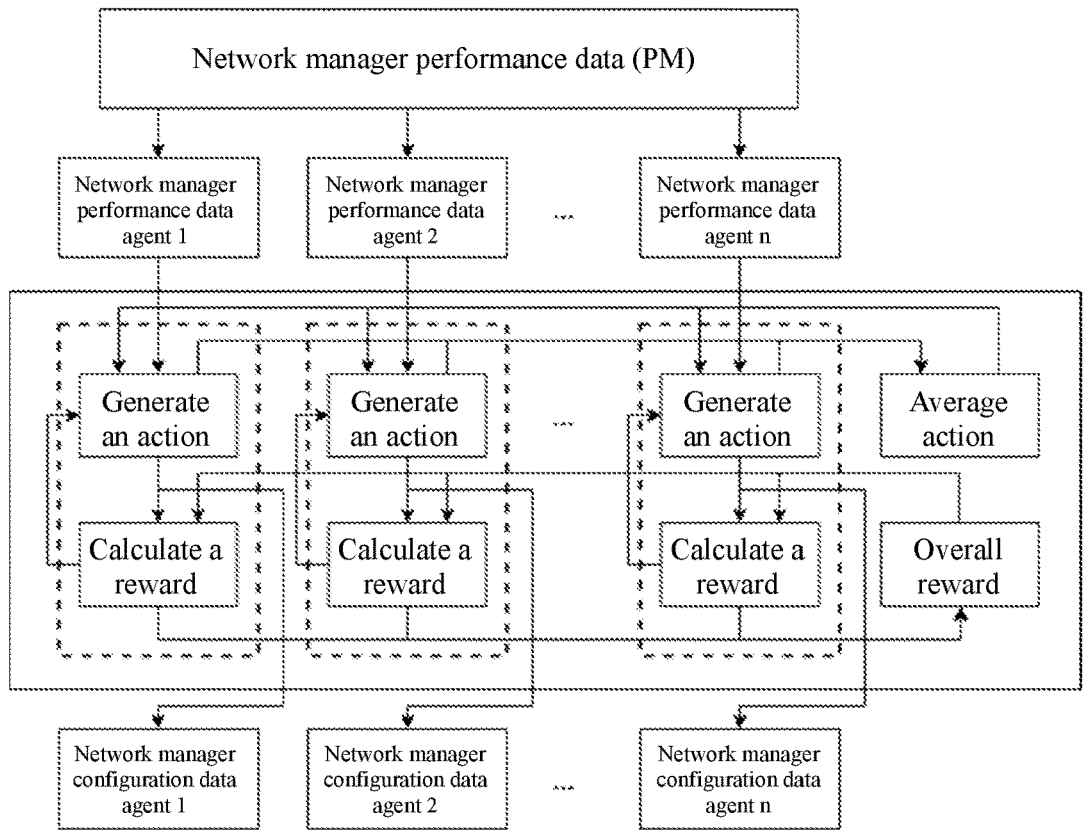
FIG. 12 is a schematic diagram of a round of iteration in a multi-agent reinforcement learning scenario according to an embodiment of the present disclosure.
Figure 13:
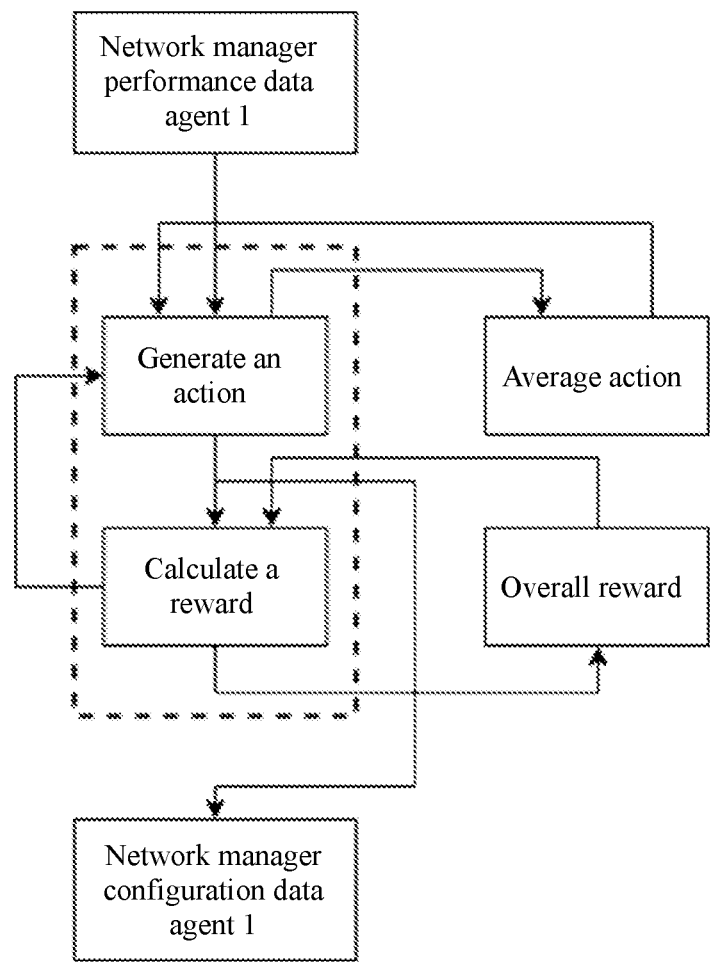
FIG. 13 is a schematic diagram of a round of iteration of a single agent in a multi-agent environment according to an embodiment of the present disclosure.

The multi-agent reinforcement learning scenario is as shown in FIG. 12. In each round of iteration, the algorithm acquires real-time network manager performance data, and each agent acquires the performance data of the respective agent from the real-time network manager performance data and identifies the current state of the respective agent based on the performance data according to the definition of the state. In this algorithm, the actions and states of multiple agents are visible to each other, and each agent searches for the actions of all the agents adjacent to this agent based on the adjacency relationship between the agents, and calculates the average action of the adjacent agents based on the mean field theory. The calculation range for the average action is as shown in FIG. 3. Each agent calculates the current optimal action based on its own state and the average action around it according to its own policy, and outputs the action data to the action sending module. The algorithm continuously monitors the changes in the state of the agent after the parameter is sent, and evaluates the sent action by means of calculating the reward, and modifies the policy of the agent to select the action accordingly. FIG. 13 illustrates the situation of each agent in one round of iteration.

When cell pairs are used as agents, the calculation of the agent reward requires reference to a proportion coefficient. Not all changes in the performance state of the 2 cells in a given cell pair are caused by the action of that agent, but may also be affected by the actions of other adjacent agents, so the proportion coefficient is calculated based on the number of adjacent agents, their average action, and the magnitude of their own actions, i.e., the percentage of the changes caused by the action of that agent in the cell performance state changes. An example is given as follows: when load balancing self-optimization is performed, the action is to adjust a switching parameter between cells, cell pairs are used as agents, and the directions and magnitudes of the actions of cell pair 1-2 and its adjacent agents in a round of iteration are as shown in FIG. 8, where the users of cell 1 are shunted to other cells, and cell 2 receives users shunted from its adjacent regions, then the proportion of the changes in the performance indicator of cell 1 caused by the action of cell pair 1-2 is R1-2/1, which is calculated in the following manner:

$$R_{1-2/1} = \frac{a_{1-2}}{\sum a_1} = \frac{a_{1-2}}{a_{1-2} + a_{1-3} + a_{1-8}} = \frac{6}{6+9+9} = 0.25$$

That is, a proportion of 0.25 of the state changes in cell 1 is caused by the action of cell pair 1-2. Similarly, the proportion of state changes among the state changes in cell 2 that are caused by the action of cell pair 1-2 is calculated, and then the reward function value caused by the action of cell pair 1-2 may be calculated, i.e., the sum of the proportion of state changes among the state changes in cell 1 that are caused by the action of cell pair 1-2 and the proportion of state changes among the state changes of cell 2 that are caused by the action of cell pair 1-2.

Figure 14:
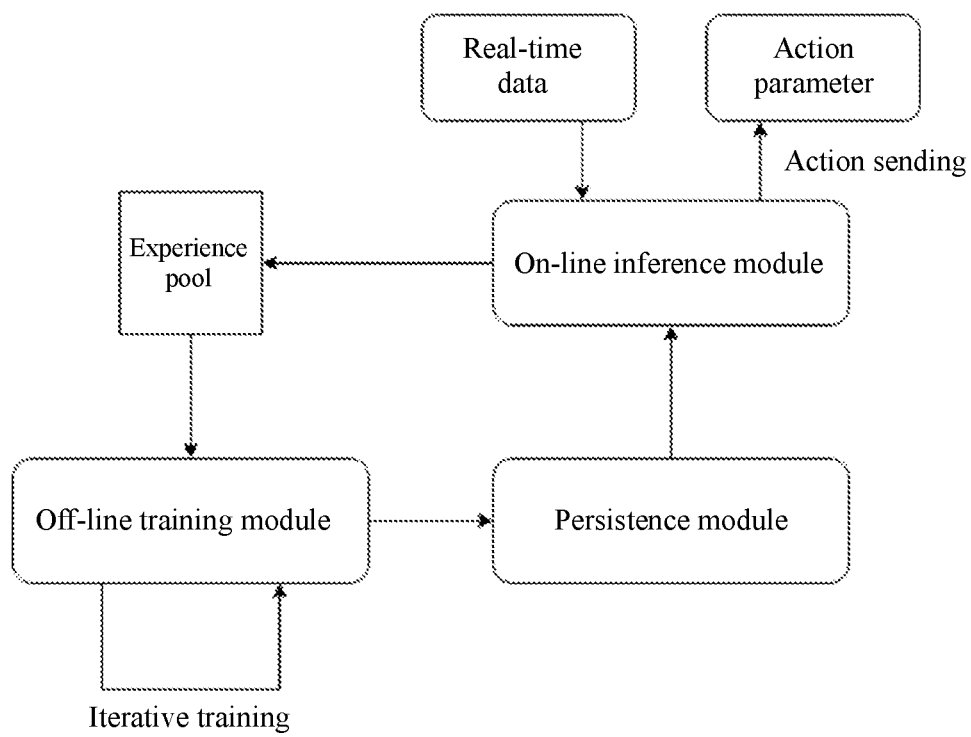
FIG. 14 is a schematic diagram of the structural composition of sub-modules of a reinforcement learning module implemented using DQN according to an embodiment of the present disclosure.

FIG. 8 is a flowchart for implementing the above multi-agent reinforcement learning using a DQN reinforcement learning algorithm (alternatively, other reinforcement learning algorithms may be used). As shown in FIG. 8, the process may be divided into two main parts: multi-agent modeling (the first half of the process in FIG. 8), and reinforcement learning iterative training (the recurrent part of the process in FIG. 8). Each agent in this algorithm maintains a neural network for decision making, and the policy for selecting an action is optimized by updating the parameter of the neural network. When implemented using this reinforcement learning algorithm, the reinforcement learning module contains several sub-modules such as an on-line inference module, an experience pool, an off-line training module and a persistence module, and its architecture diagram is as shown in FIG. 14. Here, the on-line inference module performs inference based on the policies of the agents and stores the records including rewards together into the experience pool, and the off-line training module iteratively trains the agents in accordance with the iterative process described in FIG. 4 according to the scenario described in FIG. 12 and updates, to the on-line inference module through the persistence module, the agent of which the parameter has been updated.

(8) The action sending module is mainly responsible for sending the parameter to the network manager. As shown in FIG. 11, the action sending module receives the output of the reinforcement learning module and the output of the security rollback module. There are two main categories of parameters sent by the action sending module. The first category includes action parameters sent through normal reinforcement learning iterations, and such sending is conducted in each round of iteration. The second category includes parameters of which the sending is initiated by the security rollback module. In response to detecting a deterioration of the network manager performance indicator of the adjusted region beyond a preset threshold, the security rollback module outputs all the network manager configuration parameters stored prior to the adjustment to the action sending module for sending, and rolls back all the network manager configuration parameters of the adjusted region to the state before the adjustment.

The embodiments of the present disclosure include: modeling problems existing in cells in a first region to obtain N agents, a modeling method and a training method, where the proportion of cells in which existing problems belong to the same problem category among the cells contained in the first region is greater than or equal to a preset threshold, the geographic locations of the cells contained are consecutive, and an outline of the first region is an outwardly convex figure, and N is an integer greater than or equal to 1; for each of the agents, determining an initial model of the agent according to the modeling method and the training method, and training the initial model of the agent using a reinforcement learning method according to the modeling method and the training method; or performing network optimization on a cell corresponding to the agent according to the trained model of the agent; or determining an initial model of the agent according to the modeling method and the training method, training the initial model of the agent using a reinforcement learning method according to the modeling method and the training method, and performing network optimization on a cell corresponding to the agent according to the trained model of the agent. In the embodiment of the present disclosure, by obtaining N agents through modeling, and performing respective training and/or network optimization for respective agents, the use of multiple agents enables training and/or network optimization for respective cells (i.e., respective apparatuses), allowing each agent to make self-optimization adjustments that best fit its actual situation in various situations, thus improving the overall self-optimization effect.

It can be understood by those having ordinary skills in the art that all or some of the steps of the methods, systems and functional modules/units in the devices disclosed above can be implemented as software, firmware, hardware and appropriate combinations thereof. In the hardware implementation, the division between functional modules/units mentioned in the above description does not necessarily correspond to the division of physical components; for example, a physical component may have multiple functions, or a function or step may be performed cooperatively by several physical components. Some or all of the components may be implemented as software executed by a processor, such as a digital signal processor or a microprocessor, or as hardware, or as an integrated circuit, such as an application specific integrated circuit. Such software can be distributed on computer-readable media, which can include computer storage media (or non-transitory media) and communication media (or transitory media). As well known to those have ordinary skills in the art, the term computer storage medium includes volatile and nonvolatile, removable and non-removable media implemented in any method or technology for storing information, such as computer-readable instructions, data structures, program modules or other data. A computer-readable storage medium includes, but is not limited to, RAM, ROM, EEPROM, flash memory or other memory technologies, CD-ROM, digital versatile disk (DVD) or other optical disk storage, cassettes, magnetic tapes, magnetic disk storage or other magnetic storage devices, or any other medium that can be configured to store desired information and can be accessed by a computer. Furthermore, it is well known to those have ordinary skills in the art that communication media typically contain computer-readable instructions, data structures, program modules or other data in a modulated data signal such as a carrier wave or other transmission mechanism, and can include any information transmission media.

Several implementations according to the embodiments of the present disclosure are described above, which are only for facilitating understanding of the embodiments in the present disclosure and are not intended to limit the scopes of the present disclosure. Those having ordinary skills in the art can make various modifications and changes to the forms and details of the implementations without departing from the principle and scope of the embodiments of the present disclosure, but the scope of protection of the embodiments of the present disclosure shall still be subject to the scope defined by the appended claims.

The invention claimed is:

1. A network optimization method, comprising:
modeling problems existing in cells in a first region to obtain N agents, a modeling method and a training method, wherein a proportion of cells in which existing problems belong to a same problem category among the cells contained in the first region is greater than or equal to a preset threshold, geographic locations of the cells contained in the first region are consecutive, and an outline of the first region is an outwardly convex figure, and N is an integer greater than or equal to 1; and
for each of the agents, determining an initial model of the agent according to the modeling method and the training method, and training the initial model of the agent using a reinforcement learning method according to the modeling method and the training method; or performing network optimization on a cell corresponding to the agent according to the trained initial model of the agent; or determining an initial model of the agent according to the modeling method and the training method, training the initial model of the agent using a reinforcement learning method according to the modeling method and the training method, and performing network optimization on a cell corresponding to the agent according to the trained initial model of the agent;
wherein, the determination of the first region comprises:
acquiring history performance data of all cells in a network;
determining, for each of the cells, whether the cell is a normal cell or a problematic cell according to history performance data of the cell;
dividing, into a same second region of at least one second region, cells in which existing problems belong to a same problem category among problematic cells; and
determining, for each second region, the first region according to a geographic location relationship of cells contained in the second region and the outline of the second region.

2. The method of claim 1, wherein modeling problems existing in cells in a first region to obtain N agents, a modeling method and a training method comprises:
searching, in a preset correspondence between problem categories, modeling methods and training methods, for a modeling method and a training method corresponding to a problem category to which a problem existing in a cell contained in the first region belongs, wherein the modeling method comprises: a generation method for the agent, a definition method for a state of the agent, a definition method for an action of the agent, a definition method for a reward function of the agent, and a definition method for an initial policy of the agent for selecting an action; and the training method comprises: a method for adjusting, using a reinforcement learning method, an initial policy for selecting an action; and
generating N agents according to the generation method for the agent.

3. The method of claim 2, wherein generating N agents according to the generation method for the agent comprises at least one of:
when the problems existing in the cells in the first region do not involve collaboration between multiple cells, using one cell in the first region as one agent, wherein a respective cell correspond to a respective agent; or
when the problems existing in the cells in the first region involve collaboration between multiple cells, using one cell pair with an adjacency relationship in the first region as one agent, wherein a respective cell pair with an adjacency relationship correspond to a respective agent.

4. The method of claim 1, wherein determining the first region according to a geographic location relationship of cells contained in the second region and the outline of the second region comprises at least one of:
in response to the geographic locations of the cells contained in the second region being consecutive and the outline of the second region being an outwardly convex figure, using the second region as the first region; or in response to the geographic locations of the cells contained in the second region being non-consecutive, or in response to the outline of the second region being not an outwardly convex figure, adding the second region and a minimum number of cells other than the cells contained in the second region to the first region such that the geographic locations of the cells contained in the first region are consecutive and the outline of the first region is an outwardly convex figure.

5. The method of claim 1, wherein
the modeling method comprises: a generation method for the agent, a definition method for a state of the agent, a definition method for an action of the agent, a definition method for a reward function of the agent, and a definition method for a policy of the agent for selecting an action; and the training method comprises: a method for adjusting, using a reinforcement learning method, a policy for selecting an action;

determining an initial model of the agent according to the modeling method and the training method comprises:
determining, according to the definition method for an initial policy of the agent for selecting an action, an initial policy of the agent for selecting an action, and using the initial policy of the agent for selecting an action as the initial model of the agent; and
training the initial model of the agent using a reinforcement learning method comprises, in an ith round of iteration, in response to a convergence condition being not satisfied:
selecting a random action under a first probability and sending the random action, such that the random action takes effect in the cell corresponding to the agent; and
determining a state of the agent corresponding to the ith round of iteration under a second probability according to performance data of the agent corresponding to the ith round of iteration and the definition method for the state of the agent; adjusting a policy of the agent adjusted in an (i-1)th round of iteration according to the state of the agent corresponding to the (i-1)th round of iteration, the state corresponding to the ith round of iteration, and the training method; calculating an optimal action of the agent corresponding to the ith round of iteration according to the state of the agent corresponding to the ith round of iteration, first data of the agent, and the definition method for an action of the agent; and
sending the optimal action of the agent corresponding to the ith round of iteration such that the optimal action of the agent corresponding to the ith round of iteration takes effect in the cell corresponding to the agent,
wherein a sum of the first probability and the second probability is 1, and i is an integer greater than or equal to 1; and
wherein the first data of the agent comprises:
a policy of the agent which is adjusted in the ith round of iteration; or
a policy of the agent which is adjusted in the ith round of iteration and an average action of adjacent agents.

6. The method of claim 5, wherein adjusting a policy of the agent adjusted in an (i-1)th round of iteration according to the state corresponding to the (i-1)th round of iteration, the state corresponding to the ith round of iteration, and the training method comprises:

calculating a reward function value corresponding to the (i-1) round of iteration according to the state corresponding to the (i-1)th round of iteration, the state corresponding to the ith round of iteration, and the definition method for a reward function value of the agent; and adjusting the policy of the agent adjusted in the (i-1)th round of iteration according to the reward function value corresponding to the (i-1)th round of iteration.

7. The method of claim 5, further comprising:
in the ith round of iteration, in response to the performance data of the cell corresponding to the agent corresponding to the ith round of iteration not having a deterioration beyond a preset magnitude relative to performance data corresponding to the (i-1)th round of iteration, continuing to perform: selecting a random action under the first probability as the optimal action of the agent corresponding to the ith round of iteration; or, determining the state of the agent corresponding to the ith round of iteration under the second probability according to the performance data of the agent corresponding to the ith round of iteration and the definition method for the state of the agent.

8. The method of claim 5, further comprising:
prior to a first round of iteration, storing a configuration parameter of the cell corresponding to the agent; and
in the ith round of iteration, in response to the performance data of the agent corresponding to the ith round of iteration having a deterioration beyond a preset magnitude relative to performance data corresponding to the (i-1)th round of iteration, restoring the configuration parameter of the cell corresponding to the agent to the stored configuration parameter.

9. The method of claim 1, wherein
performing network optimization on a cell corresponding to the agent according to the trained model of the agent comprises:
in a jth round of iteration, determining a state of the agent corresponding to the jth round of iteration according to performance data of the agent corresponding to the jth round of iteration and the definition method for the state of the agent; calculating an optimal action of the agent corresponding to the jth round of iteration according to the state of the agent corresponding to the jth round of iteration, second data of the agent, and the definition method for an action of the agent; and sending the optimal action of the agent corresponding to the jth round of iteration such that the optimal action of the agent corresponding to the jth round of iteration takes effect in the cell corresponding to the agent, wherein j is an integer greater than or equal to 1 or an integer greater than or equal to (M+1), M being a maximum number of rounds of iteration for model training;
and
wherein the second data of the agent comprises:
a trained policy of the agent; or
a trained policy of the agent and an average action of adjacent agents.

10. The method of claim 9, further comprising:
in the jth round of iteration, in response to the performance data of the cell corresponding to the agent corresponding to the jth round of iteration not having a deterioration beyond a preset magnitude relative to performance data corresponding to a (j-1) th round of iteration, continuing to perform the calculation of the optimal action of the agent corresponding to the jth round of iteration according to the state of the agent corresponding to the jth round of iteration and the second data of the agent.

11. The method of claim 9, further comprising:
prior to a first round of iteration, storing a configuration parameter of the cell corresponding to the agent; and
in the jth round of iteration, in response to the performance data of the agent corresponding to the jth round of iteration having a deterioration beyond a preset magnitude relative to performance data corresponding to a (j-1)th round of iteration, restoring the configuration parameter of the cell corresponding to the agent to the stored configuration parameter.

12. A non-transitory computer-readable storage medium storing a computer program which, when executed by a processor, cause the processor to perform the network optimization method of claim 1.

13. A network optimization device comprising a processor and a non-transitory computer-readable storage medium storing instructions which, when executed by the processor, cause the processor to perform a network optimization method comprising:
modeling problems existing in cells in a first region to obtain N agents, a modeling method and a training method, wherein a proportion of cells in which existing problems belong to a same problem category among the cells contained in the first region is greater than or equal to a preset threshold, geographic locations of the cells contained in the first region are consecutive, and an outline of the first region is an outwardly convex figure, and N is an integer greater than or equal to 1; and
for each of the agents, determining an initial model of the agent according to the modeling method and the training method, and training the initial model of the agent using a reinforcement learning method according to the modeling method and the training method; or performing network optimization on a cell corresponding to the agent according to the trained initial model of the agent; or determining an initial model of the agent according to the modeling method and the training method, training the initial model of the agent using a reinforcement learning method according to the modeling method and the training method, and performing network optimization on a cell corresponding to the agent according to the trained initial model of the agent;
wherein, the determination of the first region comprises:
acquiring history performance data of all cells in a network;
determining, for each of the cells, whether the cell is a normal cell or a problematic cell according to history performance data of the cell;
dividing, into a same second region of at least one second region, cells in which existing problems belong to a same problem category among problematic cells; and
determining, for each second region, the first region according to a geographic location relationship of cells contained in the second region and the outline of the second region.

14. A network optimization device, comprising:
a modeling module configured to model problems existing in cells in a first region to obtain N agents, a modeling method and a training method, wherein a proportion of cells in which existing problems belong to a same problem category among the cells contained in a first region is greater than or equal to a preset threshold, geographic locations of the cells contained are consecutive, and an outline of the first region is an outwardly convex figure, and N is an integer greater than or equal to 1; and
a training optimization module configured to, for each of the agents, determine an initial model of the agent according to the modeling method and the training method, and train the initial model of the agent using a reinforcement learning method according to the modeling method and the training method; or perform network optimization on a cell corresponding to the agent according to the trained model of the agent; or determine an initial model of the agent according to the modeling method and the training method, train the initial model of the agent using a reinforcement learning method according to the modeling method and the training method, and perform network optimization on a cell corresponding to the agent according to the trained model of the agent;
wherein, the determination of the first region comprises:
acquiring history performance data of all cells in a network;
determining, for each of the cells, whether the cell is a normal cell or a problematic cell according to history performance data of the cell;
dividing, into a same second region of at least one second region, cells in which existing problems belong to a same problem category among problematic cells; and
determining, for each second region, the first region according to a geographic location relationship of cells contained in the second region and the outline of the second region.

* * * * *